United States Patent
Caroon

(10) Patent No.: US 7,400,077 B2
(45) Date of Patent: Jul. 15, 2008

(54) ELECTRIC MOTOR HAVING MULTIPLE ARMATURES

(75) Inventor: Robert S. Caroon, Currituck, NC (US)

(73) Assignee: Electric Motor Development, Inc., Chesapeake, VA (US)

(*) Notice: Subject to any disclaimer, the term of this patent is extended or adjusted under 35 U.S.C. 154(b) by 279 days.

(21) Appl. No.: 10/991,657

(22) Filed: Nov. 18, 2004

(65) Prior Publication Data

US 2005/0212380 A1 Sep. 29, 2005

Related U.S. Application Data

(63) Continuation-in-part of application No. 10/807,359, filed on Mar. 23, 2004, now abandoned.

(51) Int. Cl.
*H02K 16/00* (2006.01)
*H02K 23/00* (2006.01)

(52) U.S. Cl. .............. 310/266; 310/112; 310/114; 310/233; 310/232

(58) Field of Classification Search ............... 310/112, 310/114, 266, 268, 233, 68 B, 68 E, 232
See application file for complete search history.

(56) References Cited

U.S. PATENT DOCUMENTS

| | | | | |
|---|---|---|---|---|
| 1,863,294 A | * | 6/1932 | Bogia | 310/46 |
| 3,042,847 A | | 7/1962 | Welch | 318/254 |
| 3,742,265 A | | 6/1973 | Smith, Jr. | 310/52 |
| 3,832,581 A | | 8/1974 | Hoffmann et al. | 310/46 |
| 3,845,338 A | | 10/1974 | Fawzy | 310/154 |
| 4,114,057 A | | 9/1978 | Esters | 310/46 |
| 4,644,206 A | | 2/1987 | Smith | 310/115 |
| 4,712,034 A | | 12/1987 | Iwasaki | 310/217 |

(Continued)

FOREIGN PATENT DOCUMENTS

JP          05-146121     *   6/1993

(Continued)

OTHER PUBLICATIONS

Machine translation of 05-146,121, Jun. 1993, Yamauchi, "Motor".*

(Continued)

*Primary Examiner*—Karl I Tamai
(74) *Attorney, Agent, or Firm*—Bowman Green Hampton & Kelly, PLLC

(57) ABSTRACT

An electric motor that includes a housing, a rotatable axle, a first field armature, which is disposed substantially around the axle and secured to the axle, and which includes a plurality of first field magnets spaced around the first field armature, a second field armature, which is disposed substantially around the first field armature and secured to the axle, and which includes a plurality of second field magnets spaced around the second field armature, an electromagnetic member, which is disposed between the first field armature and secured to the housing. The electromagnetic member includes a plurality of electromagnets spaced around the electromagnetic member, wherein each electromagnet includes a winding that is electrically coupled to an appropriate current source, wherein each winding is capable of being sequentially electrically coupled to a current source, such that an appropriate current may be sequentially provided to each winding.

12 Claims, 5 Drawing Sheets

U.S. PATENT DOCUMENTS

| | | | | |
|---|---|---|---|---|
| 4,731,554 A | | 3/1988 | Hall et al. | 310/67 R |
| 4,763,050 A | * | 8/1988 | Ruppert | 318/254 |
| 4,794,286 A | * | 12/1988 | Taenzer | 310/12 |
| 5,057,726 A | * | 10/1991 | Mole et al. | 310/67 R |
| 5,311,091 A | | 5/1994 | Maudal | 310/90 |
| 5,722,153 A | | 3/1998 | Holmes et al. | 29/598 |
| 5,793,133 A | | 8/1998 | Shiraki et al. | 310/81 |
| 5,973,436 A | | 10/1999 | Mitcham | 310/266 |
| 5,982,070 A | * | 11/1999 | Caamano | 310/216 |
| 6,002,192 A | | 12/1999 | Krivospitski et al. | 310/266 |
| 6,147,415 A | * | 11/2000 | Fukada | 290/55 |
| 6,153,959 A | | 11/2000 | Lorenzo | 310/162 |
| 6,297,575 B1 | | 10/2001 | Yang | 310/266 |
| 6,590,312 B1 | | 7/2003 | Seguchi et al. | 310/266 |
| 6,628,034 B2 | | 9/2003 | Jang et al. | 310/210 |
| 6,720,688 B1 | * | 4/2004 | Schiller | 310/64 |
| 2005/0212380 A1 | * | 9/2005 | Caroon | 310/266 |

FOREIGN PATENT DOCUMENTS

JP    06178519    6/1994

OTHER PUBLICATIONS

Hendershot et al., "Design of Brushless Permanent-Magnet Motors", p. 3-1, Jan. 1994.

* cited by examiner

ELECTRIC MOTOR HAVING MULTIPLE ARMATURES

CROSS-REFERENCE TO RELATED APPLICATIONS

This is a Continuation-In-Part of U.S. patent application Ser. No. 10/807,359, filed Mar. 23, 2004, now abandoned the disclosure of which is incorporated herein by reference.

BACKGROUND OF THE INVENTION

Field of the Invention

This invention relates generally to electric motors. In particular, the present invention relates to an electric motor having multiple armatures.

SUMMARY OF THE INVENTION

The present invention relates generally to electric motors. More specifically, the present invention relates to an electric motor having multiple field armatures.

In an illustrative, non-limiting embodiment of this invention, the inventive electric motor comprises an axle (or rotor), an electromagnetic member, a first field armature, a second field armature, and a housing. In this exemplary embodiment, the first field armature and the second field armature are coupled to the axle and form substantially concentric circles around the axle. The electromagnetic member forms a substantially concentric circle between the first field armature and the second field armature, and is coupled to the housing.

The axle is maintained within the housing by a pair of bearing or bearingless assemblies coupled to the housing. In this manner, the axle and armatures assembly is maintained in a desired position relative to the electromagnetic member and the housing.

The first field armature is located inside the electromagnetic member, as an inner field armature, while the second field armature is located outside the electromagnetic member, as an outer field armature. Each field armature comprises an equal number of field, or permanent, magnets equally spaced around the field armature. The magnets may be iron core type magnets.

The electromagnetic member is located between the first field armature and the second field armature. The electromagnetic member is comprised of a number of electromagnets equally spaced around the electromagnetic member. The number of electromagnets corresponds to the number of field magnets included in each field armature.

In an illustrative, non-limiting embodiment of this invention, the first field armature comprises eight field magnets equally spaced around the first field armature, the second field armature comprises eight field magnets equally spaced around the second field armature, and the electromagnetic member comprises eight electromagnets equally spaced around the electromagnetic member.

During operation of this invention, when the electromagnetic member is energized, magnetic flux lines are generated by each of the electromagnets of the electromagnetic member. Certain of the generated magnetic flux lines extend generally inward, from the electromagnetic member, through any air-gap between the electromagnetic member and the first field armature, to affect the field magnets of the first field armature. In this manner, a first magnetic circuit is created between the electromagnetic member and the first field armature.

When the electromagnetic member is energized, certain of the generated magnetic flux lines extend generally outward, from the electromagnetic member, through any air-gap between the electromagnetic member and the second field armature, to affect the field magnets of the second field armature. In this manner, a second magnetic circuit is created between the electromagnetic member and the second field armature.

Each of the electromagnets of the electromagnetic member is coupled to an appropriate power supply, such that the electromagnets and the electromagnetic member may function to produce the necessary electromagnetic force to act on the field magnets of the first field armature and the second field armature and rotate the first field armature and the second field armature relative to the electromagnetic member.

When the first field armature and the second field armature rotate relative to the electromagnetic member, the axle, which is coupled to the first field armature and the second field armature is rotated. By utilizing the two magnetic circuits created between the electromagnetic member, the first field armature, and the second field armature, an additive effect is realized and the amount of torque generated by the electric motor of this invention is increased relative to known electric motor geometries.

Accordingly, this invention provides an electric motor, which includes multiple field armatures.

This invention separately provides an electric motor, wherein magnetic flux lines are generated by an electromagnetic member and utilized by a first field armature disposed interior to the electromagnetic member and by a second field armature disposed exterior to the electromagnetic member.

This invention separately provides an electric motor, with improved efficiency.

This invention separately provides an electric motor, which provides increased torque.

This invention separately provides an electric motor having an improved geometry.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF THE PREFERRED EMBODIMENT

For simplicity and clarification, the design factors and operating principles of the electric motor according to this invention are explained with reference to various exemplary embodiments of an electric motor according to this invention. The basic explanation of the design factors and operating principles of the electric motor is applicable for the understanding and design and operation of the electric motor of this invention.

Figure 1:
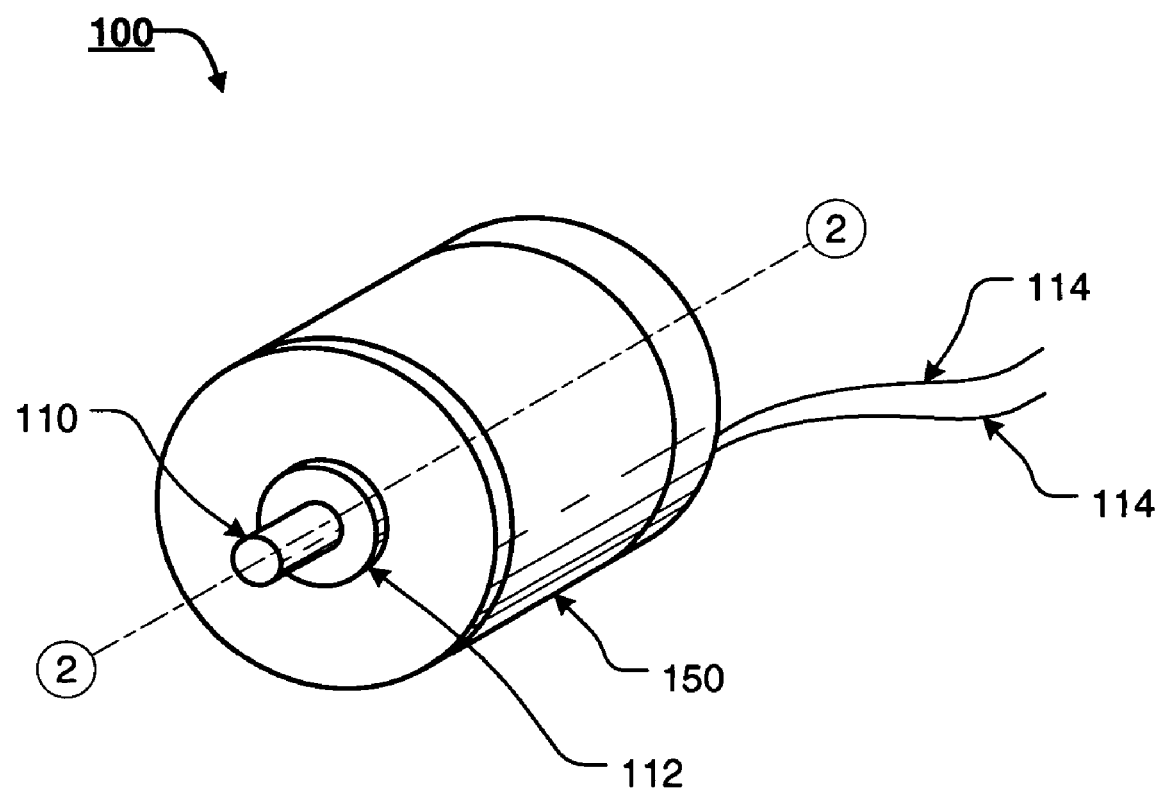
FIG. 1 shows a perspective view of a first exemplary embodiment of an electric motor according to this invention.
Figure 2:
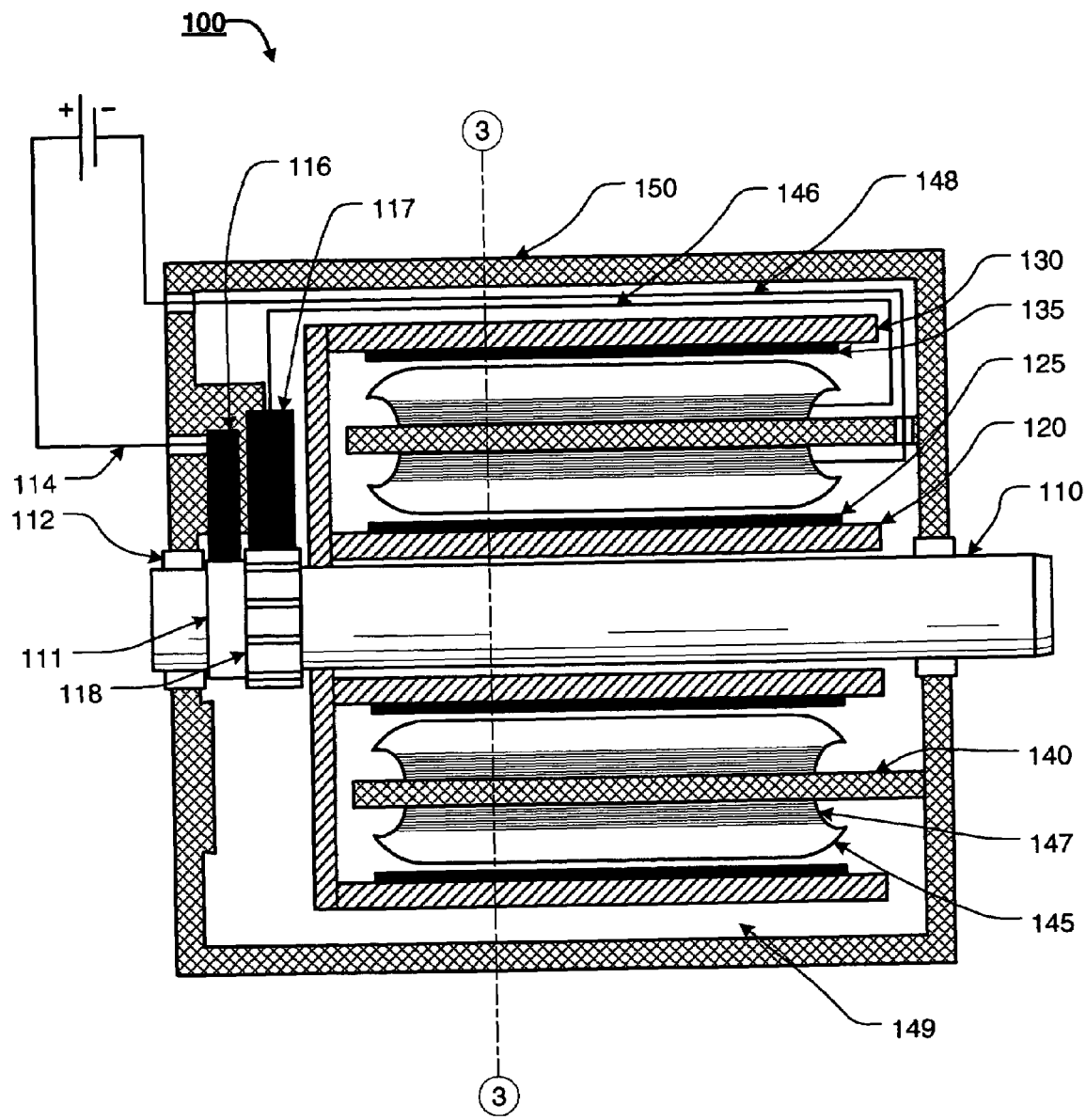
FIG. 2 shows a side cross-sectional view taken along line 2-2 of FIG. 1 of a first exemplary embodiment of an electric motor according to this invention.
Figure 3:
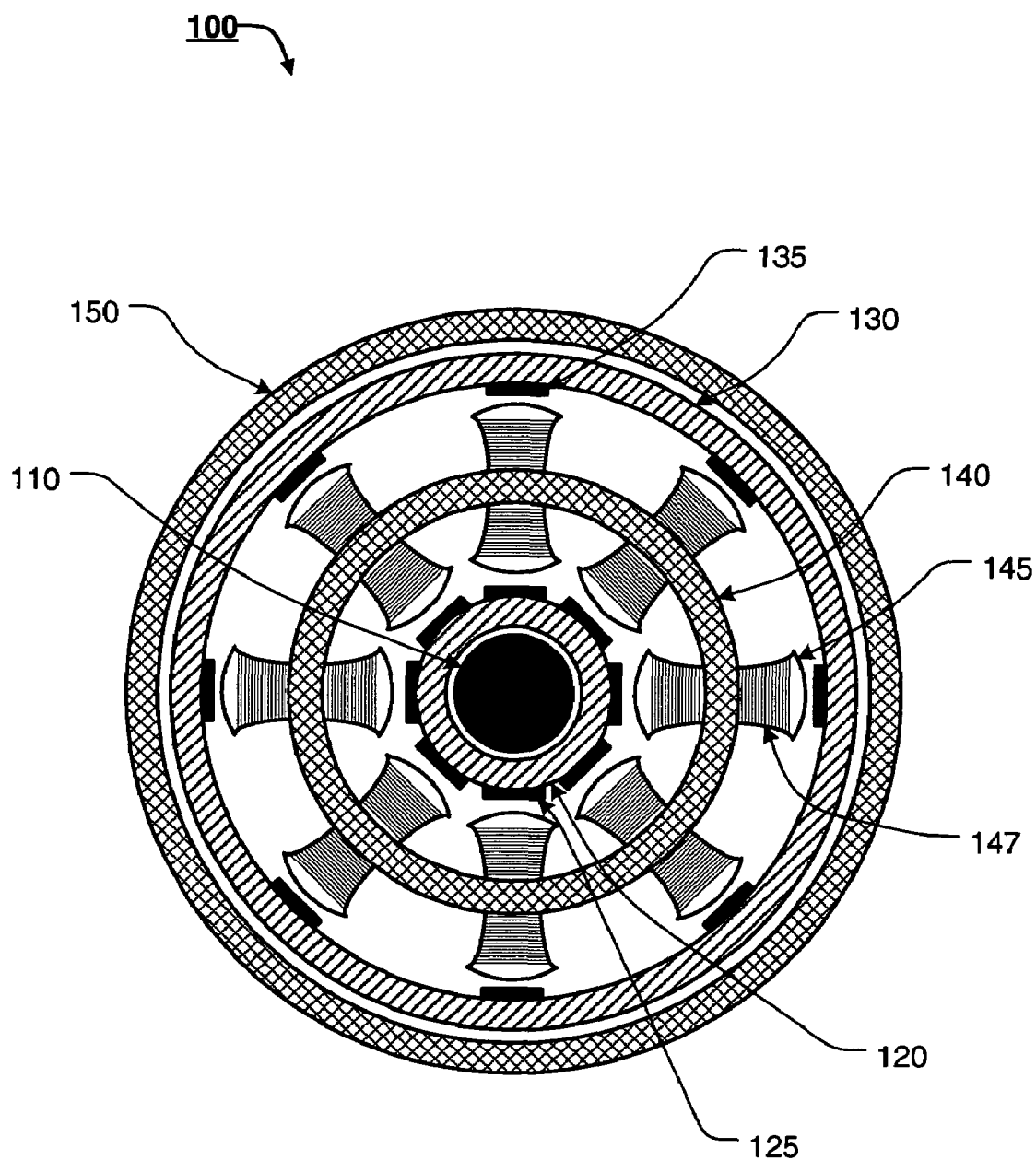
FIG. 3 shows a front cross-sectional view taken along line 3-3 of FIG. 2 of a first exemplary embodiment of an electric motor according to this invention.

FIG. 1 shows a perspective view of a first, illustrative, non-limiting embodiment of an electric motor 100, FIG. 2 shows a side cross-sectional view taken along line 2-2 of FIG. 1 of a first exemplary embodiment of an electric motor 100, and FIG. 3 shows a front cross-sectional view taken along line 3-3 of FIG. 2 of a first exemplary embodiment of an electric motor 100, each according to this invention.

As shown in FIGS. 1, 2, and 3, the electric motor 100 comprises at least one rotatable axle 110, bushings 112, leads 114, 146, and 148, an input brush 116, a commutator brush 117, a commutator 118, a first field armature 120, a plurality of first field magnets 125, a second field armature 130, a plurality of second field magnets 135, an electromagnetic member 140, a plurality of electromagnets 145, toroidal windings 147, and a housing 150.

As shown in greater detail in FIGS. 2 and 3, the electric motor 100 comprises a rotatable axle 110, which is maintained in a fixed axial position by bushings 112. In various exemplary embodiments, the bushings 112 may be ball bearings, magnetic bearings, Teflon, or any other suitable means capable of maintaining the axle 110 in a fixed axial position and allowing the axle 110 to rotate in a conventional manner. The bushings 112 are coupled to the housing 150, such that the rotatable axle 110 is maintained in an appropriate axial position relative to the housing 150.

The first field armature 120 comprises a plurality of field, or permanent, first field magnets 125 equally spaced around the first field armature 120. The first field magnets 125 may be iron core type magnets. In various exemplary embodiments, the first field armature 120 comprises eight first field magnets 125 equally spaced around the first field armature 120.

The second field armature 130 comprises a plurality of field, or permanent, second field magnets 135 equally spaced around the second field armature 130. The second field magnets 135 may be iron core type magnets. In various exemplary embodiments, the second field armature 130 comprises eight second field magnets 135 equally spaced around the second field armature 130.

As shown in FIGS. 2 and 3, the first field armature 120 and the second field armature 130 form substantially concentric circles around the axle 110 and are each secured to the axle 110. The first field armature 120 is located inside the electromagnetic member 140, as an inner field armature, while the second field armature 130 is located outside the electromagnetic member 140, as an outer field armature.

The electromagnetic member 140 comprises a plurality of electromagnets 145 equally spaced around the electromagnetic member 140. The electromagnetic member 140 forms a substantially concentric circle between the first field armature 120 and the second field armature 130, and is secured to the housing 150. In various exemplary embodiments, the number of electromagnets corresponds to the number of field magnets included in each field armature. Each electromagnet 145 comprises a series of coils, or toroidal windings 147, wound around each electromagnet 145. Each toroidal winding 147 is in electrical contact with an appropriate section or segment of the commutator 118, via the commutator brush 117.

An appropriate current or power source is electrically coupled to the input brush 116, by lead 114. The input brush 116 is in electrical contact with the input segment 111. In various exemplary embodiments, the input segment 111 comprises a portion of the commutator 118 and is electrically coupled to the appropriate, electrically conductive sections or segments of the commutator 118 such that electrical current may be provided to the electrically conductive sections or segments of the commutator 118.

In other exemplary embodiments, the input segment 111 comprises a portion of the rotatable axle 110. In these exemplary embodiments, at least a portion of the rotatable axle 110 is electrically coupled to the appropriate sections or segments of the commutator 118 such that electrical current may be provided to the appropriate sections or segments of the commutator 118.

The input segment 111 is in electrical contact with the input brush 116 using presently known methods, which are understood and apparent to those skilled in the art. In various exemplary embodiments, the input brush 116 comprises metal or carbon, which makes electrical contact with the input segment 111.

The appropriate section(s) or segment(s) of the commutator 118 are in electrical contact with the commutator brush 117 using presently known methods, which are understood and apparent to those skilled in the art. In various exemplary embodiments, the commutator brush 117 comprises metal or carbon, which makes electrical contact with the section(s) or segment(s) of the commutator 118.

In this manner, each electrically conductive section(s) or segment(s) of the commutator 118 may be in sequential electrical contact with an appropriate toroidal winding 147, via a corresponding lead 146. Each appropriate toroidal winding 147 may, in turn, be in sequential electrical contact with the current or power source by a corresponding lead 148.

Thus, as the axle 110 is rotated, appropriate section(s) or segment(s) of the commutator 118 are in sequential electrical contact with the input brush 116 and the commutator brush 117 and an appropriate current is simultaneously provided to each of electromagnets 145 of the electromagnetic member 140.

It should be appreciated that, for simplicity and clarification, the embodiments of this invention are shown and/or described with reference to the electric motor 100 having eight first field magnets 125, eight second field magnets 135, and eight electromagnets 145. However, the number of first field magnets 125, second field magnets 135, and electromagnets 145 of the electric motor 100 is intended to be illustrative, not limiting. Thus, it should be understood that the number of first field magnets 125, second field magnets 135, and electromagnets 145 of the electric motor 100 may be varied and more or less than eight first field magnets 125, eight second field magnets 135, and/or eight electromagnets 145 may be used, depending on, for example, the desired size of the electric motor 100 or the specific application electric motor 100 is to be used in.

Figure 4:
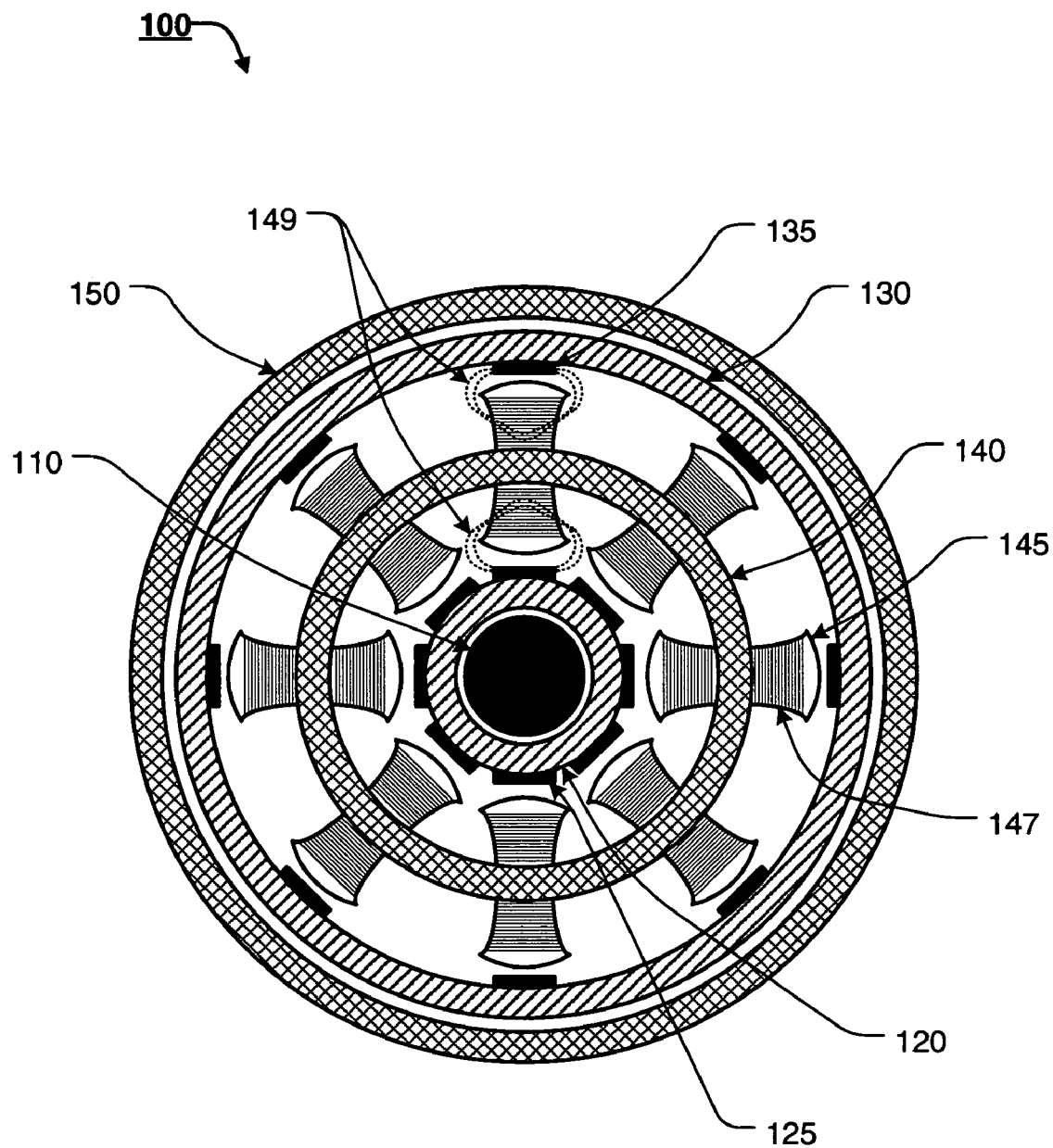
FIG. 4 shows a front cross-sectional view taken along line 3-3 of FIG. 2 of a first exemplary embodiment of an electric motor according to this invention, showing certain flux lines crossing certain air gaps.

FIG. 4 shows a front cross-sectional view taken along line 3-3 of FIG. 2 of a first exemplary embodiment of an electric motor 100 according to this invention, showing certain flux lines crossing certain air gaps.

As shown in FIG. 4, during operation of this invention, when the electromagnets 145 of the electromagnetic member 140 are appropriately energized, magnetic flux lines (exemplary magnetic flux lines 149 are illustrated) are simultaneously generated by the electromagnets 145 of the electromagnetic member 140. Certain of the generated magnetic flux lines extend generally inward, from the electromagnetic member 140, through the air-gap between the electromagnetic member 140 and the first field armature 120, to affect the first field magnets 125 of the first field armature 120. In this manner, a first magnetic circuit is created between the electromagnetic member 140 and the first field armature 120.

When the electromagnetic member 140 is energized, certain of the generated magnetic flux lines (exemplary magnetic flux lines 149 are illustrated) extend generally outward, from the electromagnetic member 140, through the air-gap between the electromagnetic member 140 and the second field armature 130, to affect the second field magnets 135 of the second field armature 130. In this manner, a second magnetic circuit is created between the electromagnetic member 140 and the second field armature 130.

As described above, each of the electromagnets 145 of the electromagnetic member 140 is simultaneously energized to produce the necessary electromagnetic force to act on the first field magnets 125 of the first field armature 120 and the second field magnets 135 of the second field armature 130 and rotate the first field armature 120 and the second field armature 130 relative to the electromagnetic member 140.

When the first field armature 120 and the second field armature 130 rotate relative to the electromagnetic member 140, the axle 110, which is coupled to the first field armature 120 and the second field armature 130 is rotated.

Figure 5:
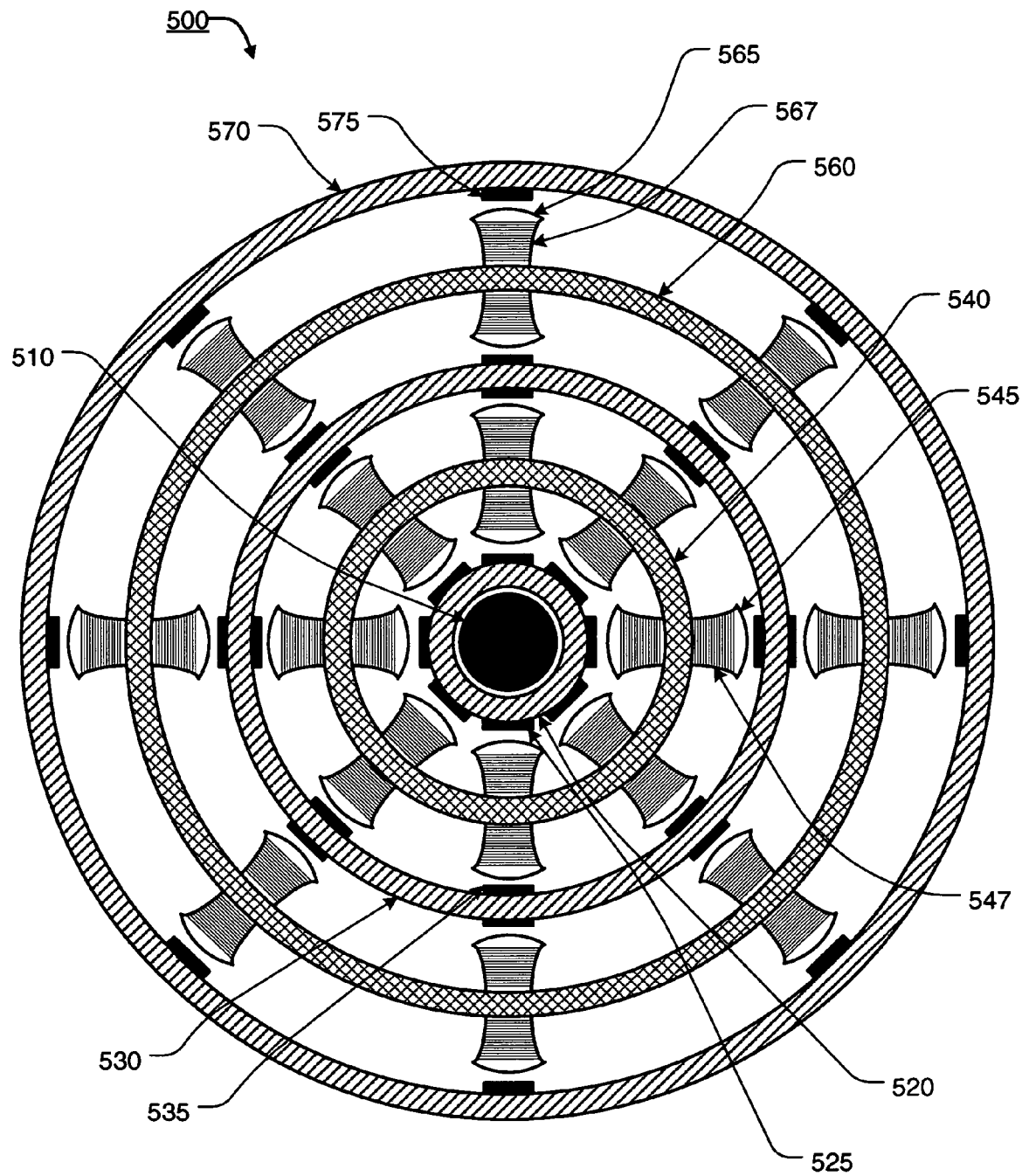
FIG. 5 shows a front cross-sectional view of a second exemplary embodiment of an electric motor according to this invention.

FIG. 5 shows a front cross-sectional view of a second exemplary embodiment of an electric motor 500 according to this invention. As shown in FIG. 5, the electric motor 500 comprises at least some of a rotatable axle 510, bushings (not shown), leads (not shown), brushes (not shown), a commutator (not shown), a first field armature 520, a plurality of first field magnets 525, a second field armature 530, a plurality of second field magnets 535, an electromagnetic member 540, a plurality of electromagnets 545, toroidal windings 547, and a housing (not shown).

It should be understood that each of these elements corresponds to and operates similarly to the rotatable axle 110, the bushings 112, the leads 114, 146, and 148, the input brush 116 and commutator brush 117, the commutator 118, the first field armature 120, the plurality of first field magnets 125, the second field armature 130, the plurality of second field magnets 135, the electromagnetic member 140, the plurality of electromagnets 145, the toroidal windings 147, and the housing 150, as described above with reference to FIGS. 1-4.

However, as shown in FIG. 5, the electric motor 500 comprises a second electromagnetic member 560, a plurality of second electromagnets 565, and second electromagnet toroidal windings 567, a third field armature 570, and a plurality of third field magnets 575.

As shown in FIG. 5, the plurality of second field magnets 535 may be portions of the same plurality of second field magnets 535 exposed on both sides of the second field armature 530. In other exemplary embodiments, the plurality of second field magnets 535 may comprise a plurality of inner second field magnets at least partially exposed on an inner side of the second field armature 530 and a plurality of outer second field magnets at least partially exposed on an outer side of the second field armature 530.

The third field armature 570 is secured to the axle 510 and the second electromagnetic member 170 is secured to the housing 550 (not shown).

During operation of the electric motor 500, when the electromagnets 545 of the electromagnetic member 540 are appropriately energized, magnetic flux lines are simultaneously generated by the electromagnets 545 of the electromagnetic member 540. Certain of the generated magnetic flux lines extend generally inward, from the electromagnetic member 540, through the air-gap between the electromagnetic member 540 and the first field armature 520, to affect the first field magnets 525 of the first field armature 520. In this manner, a first magnetic circuit is created between the electromagnetic member 540 and the first field armature 520.

When the electromagnets 545 of the electromagnetic member 540 are appropriately energized, certain of the generated magnetic flux lines extend generally outward, from the electromagnetic member 540, through the air-gap between the electromagnetic member 540 and the second field armature 530, to affect the second field magnets 535 of the second field armature 530. In this manner, a second magnetic circuit is created between the electromagnetic member 540 and the second field armature 530.

When the second electromagnets 565 of the second electromagnetic member 560 are appropriately energized, magnetic flux lines are sequentially generated by the second electromagnets 565 of the second electromagnetic member 560. Certain of the generated magnetic flux lines extend generally inward, from the second electromagnetic member 560, through the air-gap between the second electromagnetic member 560 and the second field armature 530, to affect the second field magnets 535 of the second field armature 530. In this manner, a third magnetic circuit is created between the second electromagnetic member 560 and the second field armature 530.

When the second electromagnets 565 of the second electromagnetic member 560 are appropriately energized, certain of the generated magnetic flux lines extend generally outward, from the second electromagnetic member 560, through the air-gap between the second electromagnetic member 560 and the third field armature 570, to affect the third field magnets 575 of the third field armature 570. In this manner, a fourth magnetic circuit is created between the second electromagnetic member 560 and the third field armature 570.

As described above, each of the electromagnets of each electromagnetic member is simultaneously energized to produce the necessary electromagnetic force to act on the appropriate field magnets of the first field armature 520, the second field armature 530, and the third field armature 570, and rotate the first field armature 520, the second field armature 530, and the third field armature 570 relative to the electromagnetic member 540 and the second electromagnetic member 560.

When the first field armature 520, the second field armature 530, and the third field armature 570 rotate relative to the electromagnetic member 540 and the second electromagnetic member 560, the axle 510, which is coupled to the first field armature 520, the second field armature 530, and the third field armature 570, is rotated.

With the addition of the second electromagnetic member 560 and the third field armature 570, an additional additive effect is again realized and the amount of torque generated by the electric motor 500 is increased.

While this invention has been described in conjunction with the exemplary embodiments outlined above, it is evident that many alternatives, modifications, and variations will be apparent to those skilled in the art. For example, the electric motor of this invention may include multiple additional field armatures and electromagnetic members, wherein each field armature is secured to the axle of the electric motor and each electromagnetic member is secured to the housing.

Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. An electric motor apparatus, comprising:
   a housing;
   a rotatable axle, wherein the rotatable axle is maintained in a fixed axial position relative to the housing by bushings, and wherein the bushings are coupled to the housing;
   an input brush electrically coupled to an appropriate current source;
   an input segment coupled to the rotatable axle and disposed substantially around the rotatable axle, wherein the input brush is in electrical contact with the input segment;
   a commutator coupled to the rotatable axle and disposed substantially around the rotatable axle, wherein the commutator comprises multiple electrically conductive segments and multiple non-conductive segments arranged sequentially around the commutator and wherein each electrically conductive segment is electrically coupled to the input segment;
   a commutator brush capable of being in sequential electrical contact with each electrically conductive segment as the axle is rotated;
   a first field armature, wherein the first field armature comprises a plurality of first field magnets spaced around the first field armature, wherein the first field armature is disposed substantially around the axle, and wherein the first field armature is coupled to the axle;
   a second field armature, wherein the second field armature comprises a plurality of second field magnets spaced around the second field armature, wherein the second field armature is disposed substantially around the first field armature, and wherein the second field armature is coupled to the axle;
   an electromagnetic member, wherein the electromagnetic member comprises a plurality of electromagnets spaced around the electromagnetic member, wherein each electromagnet comprises a winding that is electrically coupled to the electrically conductive segments of the commutator, wherein the electromagnetic member is disposed between the first field armature and the second field armature, such that the first field armature is disposed substantially inside the electromagnetic member and the second field armature is disposed substantially outside the electromagnetic member, and wherein the electromagnetic member is coupled to the housing; and
   wherein, as the axle rotates, when the commutator brush is in electrical contact with an electrically conductive segment of the commutator, each winding is simultaneously electrically coupled to the appropriate current source, such that, an appropriate electrical current is simultaneously provided to each winding, and wherein the input segment comprises a portion of the rotatable axle and wherein at least a portion of the rotatable axle is electrically coupled to the electrically conductive segments of the commutator such that electrical current may be provided to the electrically conductive segments of the commutator.

2. The apparatus of claim 1, wherein the field magnets comprise iron core magnets.

3. The apparatus of claim 1, wherein the first field armature comprises eight first field magnets.

4. The apparatus of claim 1, wherein the bushings comprise ball bearings, magnetic bearings, Teflon, or an equivalent.

5. The apparatus of claim 1, wherein the second field armature comprises eight second field magnets.

6. The apparatus of claim 1, wherein the first field armature forms a substantially concentric circle around the axle.

7. The apparatus of claim 1, wherein the second field armature forms substantially concentric circle around the first field armature.

8. The apparatus of claim 1, wherein the number of electromagnets corresponds to the number of field magnets included in the first field armature.

9. The apparatus of claim 1, wherein the input segment comprises a portion of the commutator and is electrically coupled to the electrically conductive segments of the commutator such that electrical current may be provided to the electrically conductive segments of the commutator.

10. The apparatus of claim 1, comprising:
    a third field armature, wherein the third field armature comprises a plurality of third field magnets spaced around the third field armature, wherein the third field armature is disposed substantially around the second field armature, and wherein the third field armature is coupled to the axle;
    a second electromagnetic member, wherein the second electromagnetic member comprises a plurality of second electromagnets spaced around the second electromagnetic member, wherein each second electromagnet comprises a winding that is electrically coupled to an appropriate segment of the commutator, wherein the second electromagnetic member is disposed between the second field armature and the third field armature, such that the second field armature is disposed substantially inside the second electromagnetic member and the third field armature is disposed substantially outside the second electromagnetic member, and wherein the second electromagnetic member is coupled to the housing.

11. The apparatus of claim 10, wherein the plurality of second field magnets comprises a plurality of inner second field magnets disposed substantially along an inner side of the second field armature and a plurality of outer second field magnets disposed substantially along an outer side of the second field armature.

12. The apparatus of claim 1, comprising multiple additional field armatures and electromagnetic members, wherein each field armature is coupled to the axle of the electric motor and each electromagnetic member is coupled to the housing.

* * * * *